United States Patent
Bates et al.

(10) Patent No.: US 7,752,388 B2
(45) Date of Patent: Jul. 6, 2010

(54) APPARATUS AND METHOD TO STORE INFORMATION IN MULTIPLE HOLOGRAPHIC DATA STORAGE MEDIA

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 11/739,612

(22) Filed: Apr. 24, 2007

(65) Prior Publication Data

US 2008/0266623 A1 Oct. 30, 2008

(51) Int. Cl.
G06F 12/00 (2006.01)
G06F 13/00 (2006.01)
G06F 13/28 (2006.01)

(52) U.S. Cl. .................................................. 711/114
(58) Field of Classification Search ................ 711/114; 369/103; 359/12, 35
See application file for complete search history.

(56) References Cited

U.S. PATENT DOCUMENTS

| | | | |
|---|---|---|---|
| 5,559,764 A | 9/1996 | Chen et al. | |
| 5,566,387 A * | 10/1996 | Dewald | 369/103 |
| 6,147,578 A * | 11/2000 | Panfil et al. | 335/296 |
| 6,785,788 B1 | 8/2004 | Sands, III | |
| 6,816,330 B2 * | 11/2004 | Ikeda et al. | 360/59 |
| 2002/0046360 A1 | 4/2002 | Watkins et al. | |
| 2002/0120812 A1 | 8/2002 | Ageishi et al. | |
| 2005/0216660 A1 | 9/2005 | Kobayashi et al. | |
| 2005/0235337 A1 | 10/2005 | Wilson et al. | |
| 2006/0161944 A1 * | 7/2006 | Edwards | 720/725 |
| 2006/0190682 A1 | 8/2006 | Noguchi et al. | |
| 2006/0195670 A1 | 8/2006 | Iwamura et al. | |
| 2008/0008076 A1 * | 1/2008 | Raguin et al. | 369/103 |
| 2008/0313395 A1 * | 12/2008 | Bates et al. | 711/112 |
| 2009/0010089 A1 * | 1/2009 | Bates et al. | 365/216 |

OTHER PUBLICATIONS

Chen et al, "Optimal Data Allotment to Build High Availability and High Performance Disk Arrays", IBM, TDB, v 37, n5, May 1994, pp. 75-80.

* cited by examiner

*Primary Examiner*—Sheng-Jen Tsai
(74) *Attorney, Agent, or Firm*—Dale F. Regelman; Quarles & Brady LLP

(57) ABSTRACT

A method is disclosed to store information in multiple holographic data storage media. The method supplies a first holographic data storage medium, defines an inner storage portion of that first holographic data storage medium, and defines an outer storage portion of that first holographic data storage medium. The method further supplies a second holographic data storage medium, defines an inner storage portion of that second holographic data storage medium and defines an outer storage portion of that second holographic data storage medium. The method provides information, encodes a hologram comprising that information into the outer storage portion of the first holographic data storage medium, and encodes the information in the inner storage portion of the second holographic data storage medium.

17 Claims, 15 Drawing Sheets

802

806

804

APPARATUS AND METHOD TO STORE INFORMATION IN MULTIPLE HOLOGRAPHIC DATA STORAGE MEDIA

FIELD OF THE INVENTION

This invention relates to an apparatus and method to store information in multiple holographic data storage media.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce, for example a simple collimated beam with a planar wavefront.

The resulting optical interference pattern causes chemical and/or physical changes in the photosensitive medium: a replica of the interference pattern is stored as a change in the absorption, refractive index, or thickness of the photosensitive medium. When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to store information in multiple holographic data storage media. The method supplies a first holographic data storage medium, defines an inner storage portion of that first holographic data storage medium, and defines an outer storage portion of that first holographic data storage medium. The method further supplies a second holographic data storage medium, defines an inner storage portion of that second holographic data storage medium and defines an outer storage portion of that second holographic data storage medium. The method provides information, encodes a hologram comprising that information into the outer storage portion of the first holographic data storage medium, and encodes the information in the inner storage portion of the second holographic data storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
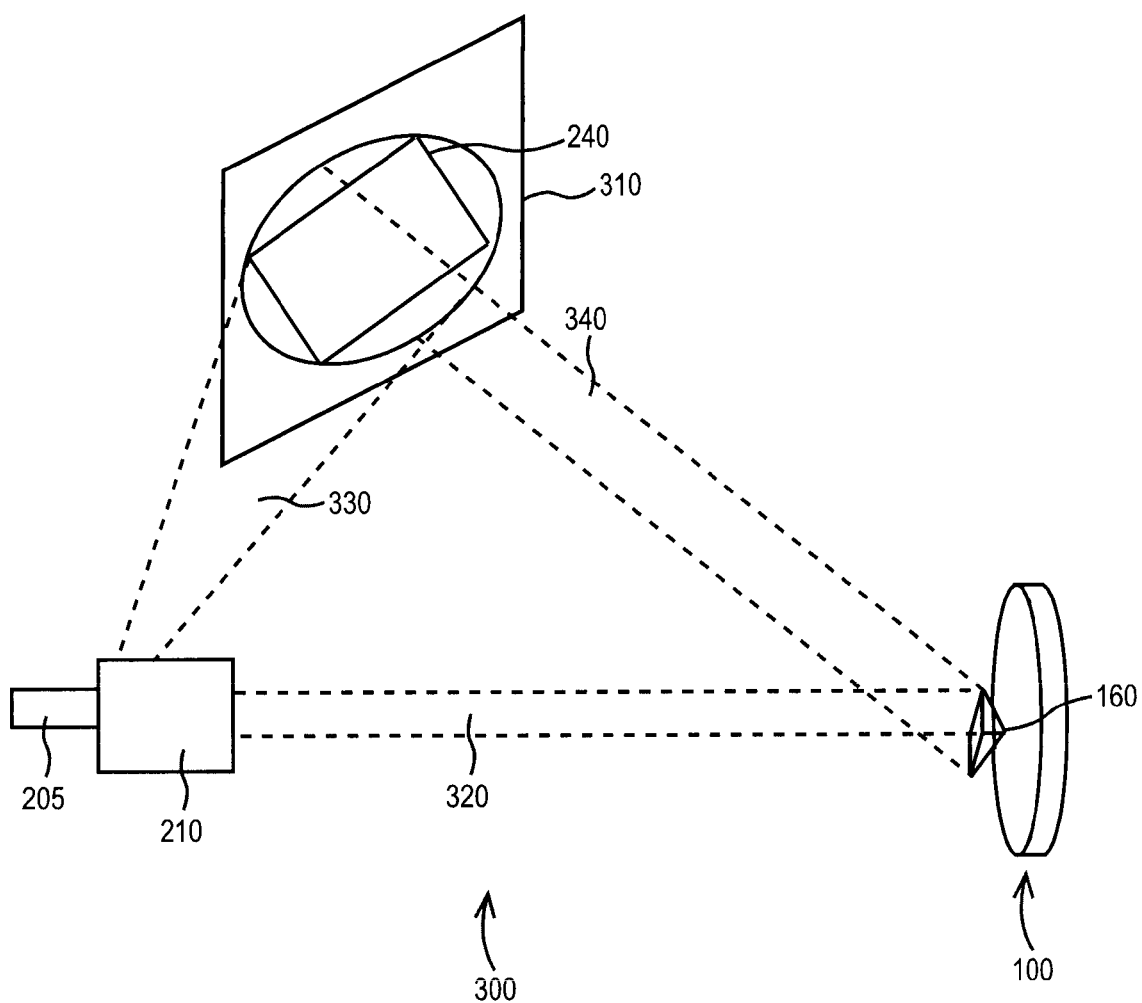
FIG. 3 is a block diagram showing Applicants' holographic data storage system being used to encode information in a holographic data storage medium.
Figure 4:
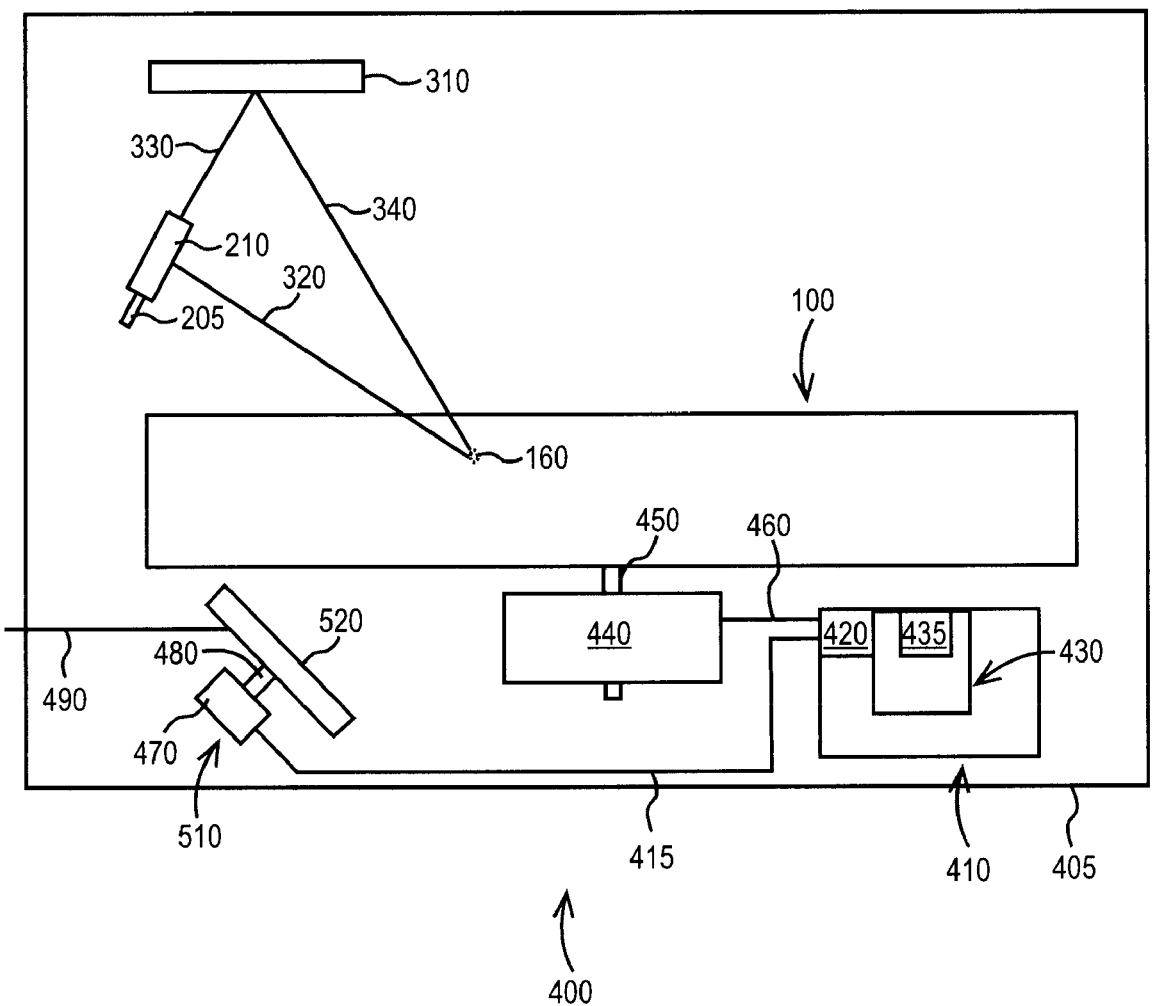
FIG. 4 is a block diagram showing the elements of FIG. 3 disposed in a holographic drive, wherein the holographic drive is shown encoding a hologram into a holographic data storage medium.
Figure 5:
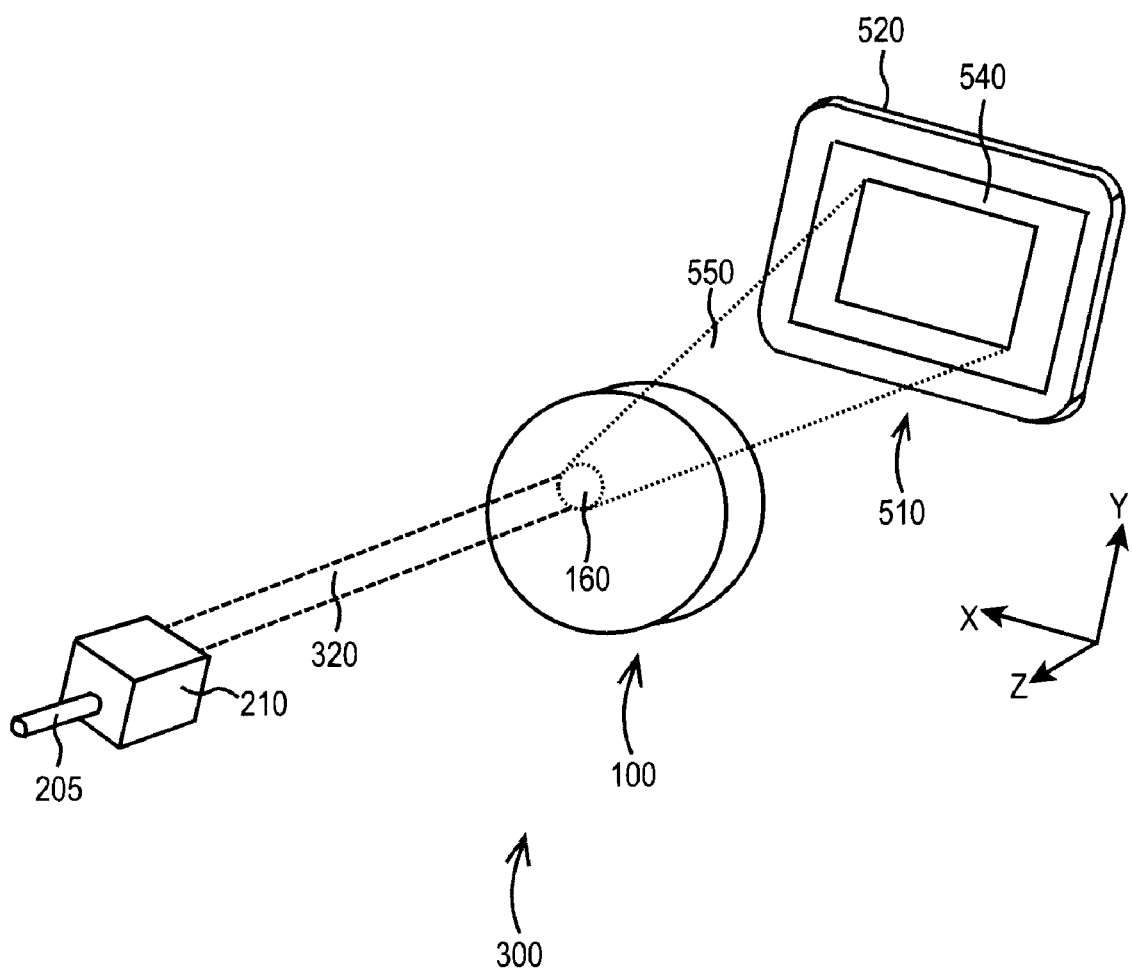
FIG. 5 is a block diagram showing Applicants' holographic data storage system being used to decode information encoded in a holographic data storage medium.

Referring now to FIGS. 3 and 5, holographic data storage system 300 comprises laser light source 205, beam splitter 210, reflective spatial light modulator 310, holographic storage medium 100, and optical sensor array 510 (FIGS. 4, 6) which comprises input screen 520 (FIGS. 4, 5, 6, 9, 10, 11). The light generated by source 205 is split by beam splitter 210 into reference beam 320, and carrier beam 330.

In the illustrated embodiment of FIG. 3, reflective spatial light modulator ("RSLM") 310 displays image 240. In certain embodiments, reflective spatial light modulator 310 comprises an assembly comprising a plurality of micro mirrors. In other embodiments, reflective spatial light modulator 310 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 330 picks up image 240 as the light is reflected off reflective spatial light modulator 310 to form reflected data beam 340 comprising image 240. Unreflected reference beam 320 interferes with reflected data beam 340 to form hologram 160 within holographic storage medium 100. Hologram 160 is encoded into holographic data storage medium 100 as an interference pattern.

FIG. 5 illustrates holographic data storage system 300 decoding the interference pattern comprising the encoded hologram 160 stored in media 100. Input screen 520 (FIGS. 4, 5, 6, 9, 10, 11) is disposed a distance away from holographic storage medium 100 sufficient to digitally capture the reconstructed data beam 550 projected upon it. To decode the interference pattern comprising hologram 160 (FIGS. 4, 5, 6, 10), reference beam 320 is incident on the encoded holographic storage medium 100. As the reference beam 320 interferes with the interference pattern, a reconstructed data beam 550 is generated, wherein that reconstructed data beam 550 comprises an image 540 resembling the original image 240. Optical sensor array 510 (FIGS. 4, 6) digitally captures the information comprising image 540 on input screen 520.

Figure 6:
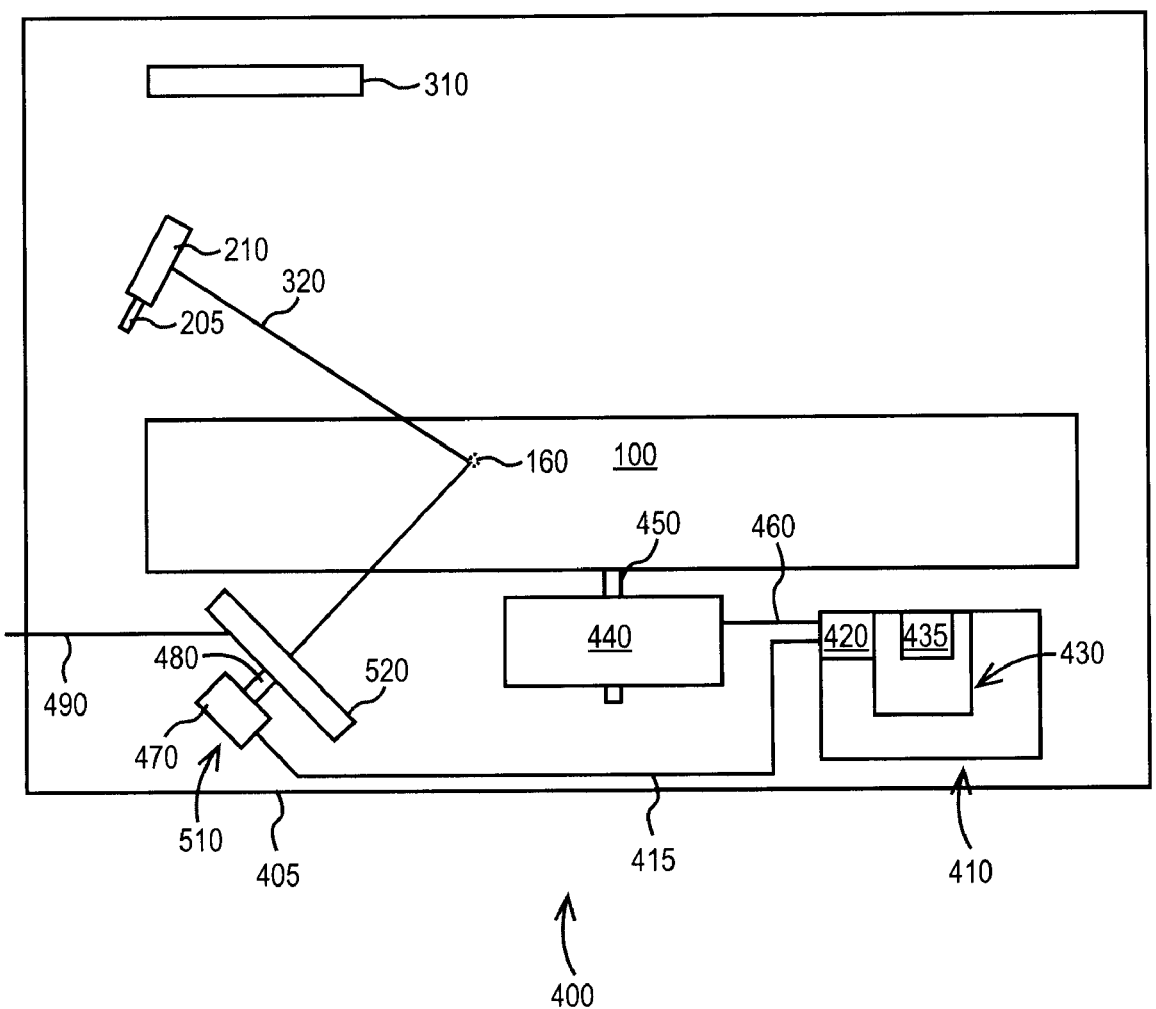
FIG. 6 is a block diagram showing the holographic drive of FIG. 4 being used to decode a hologram encoded in a holographic data storage medium.

Referring now to FIGS. 4 and 6, in certain embodiments laser light source 205, beam splitter 210, reflective spatial light modulator 310, and optical sensor array 510, are disposed within holographic drive apparatus 400. In the illustrated embodiment of FIGS. 4 and 6, holographic drive apparatus 400 further comprises housing 405.

In certain embodiments, holographic data storage medium 100 can be removeably disposed within housing 405. In the illustrated embodiment of FIGS. 4 and 6, holographic data storage medium 100 is releaseably attached to a drive servo mechanism comprising drive servo 440 and rotatable shaft 450. Drive servo 440 rotates rotatable shaft 450 thereby causing holographic data storage medium 100 to rotate also.

Optical sensor array 510 comprises rotation-error-servo ("RES") 470. As those skilled in the art will appreciate, a servo comprises a device comprising an external shaft, such as rotatable shaft 480. Rotatable shaft 480 can be positioned to specific angular positions by sending RES 470 a pre-defined coded signal. As long as that coded signal exists on input line 415, RES 470 will maintain the associated angular position of shaft 480. As the coded signal changes, the angular position of the shaft 480 changes.

RES 470 is interconnected by rotatable shaft 480 to rear portion of input screen 520 (FIGS. 4, 5, 6, 9, 10, 11). RES 470 can cause input screen 520 to rotate in a first direction, i.e. clockwise, or to rotate in a second and opposite direction, i.e. counter-clockwise, by causing rotatable shaft 480 to rotate in the first direction or in the second direction, respectively.

In the illustrated embodiment of FIGS. 4 and 6, holographic drive apparatus 400 further comprises drive controller 410. Drive controller 410 comprises processor 420, memory 430, and microcode 435 written to memory 430. Drive controller 410 is interconnected with drive servo 440 via communication link 460, and with RES 470 via communication link 415. Drive controller 410, using processor 420 and microcode 435, can cause holographic data storage medium 100 to rotate at a first rotation rate, and can simultaneously cause input screen 520 (FIGS. 4, 5, 6, 9, 10, 11) to rotate at a second rotation rate, wherein the first rotation rate may equal the second rotation rate, and wherein the first rotation rate may differ from the second rotation rate.

In certain embodiments, memory 430 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

FIG. 4 shows holographic drive apparatus 400 being used to encode hologram 160 as an interference pattern in holographic data storage medium 100. FIG. 6 shows holographic drive apparatus 400 being used to decode the interference pattern comprising hologram 160. In the illustrated embodiment of FIGS. 4 and 6, sensor array 510 outputs information using communication link 490. In certain embodiments, communication link 490 is interconnected with one or more host computers. In certain embodiments, communication link 490 is interconnected with a storage controller, such as for example storage controller 760 (FIG. 7).

Figure 7:
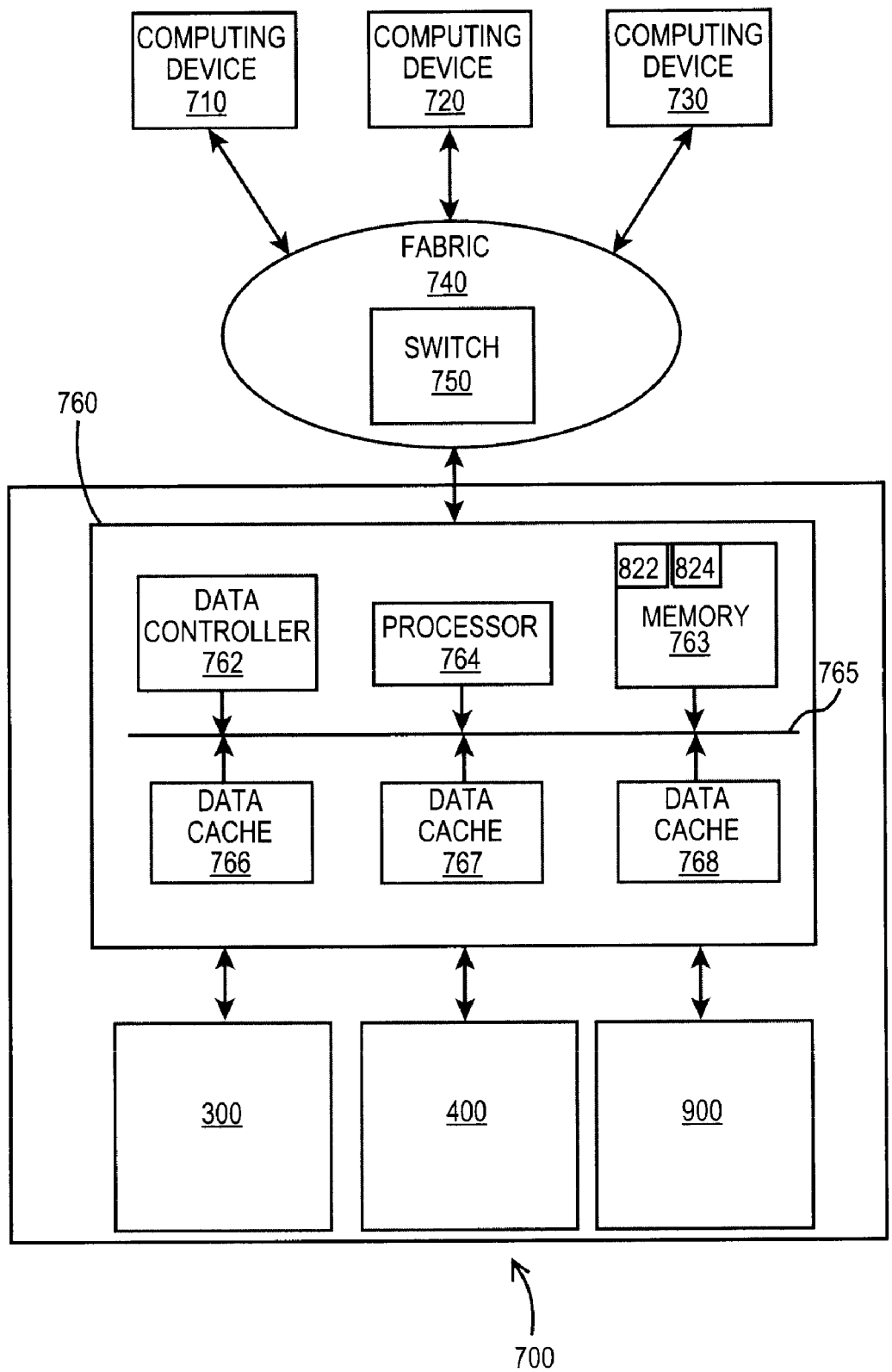
FIG. 7 is a block diagram showing one embodiment of Applicants' data storage and retrieval system.
Figure 9:
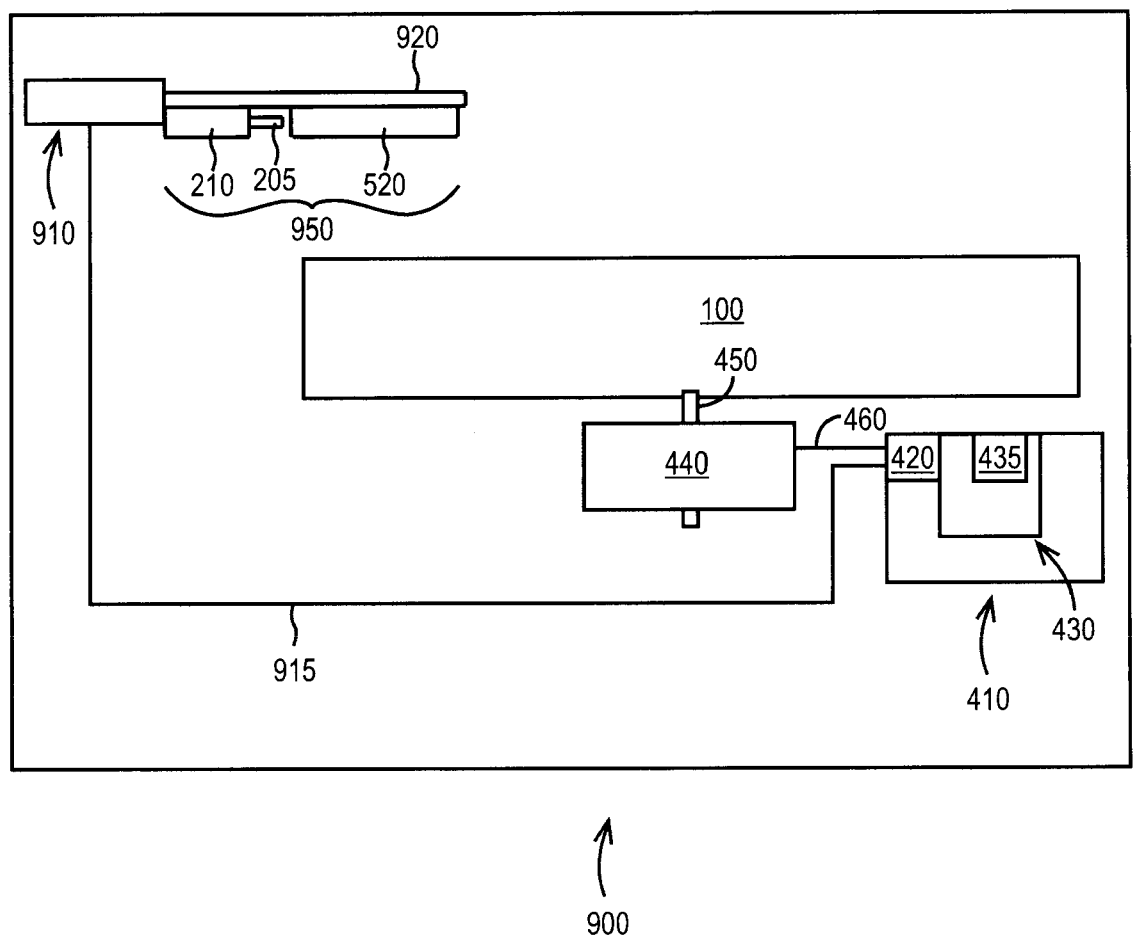
FIG. 9 is a block diagram showing Applicants' holographic drive comprising a moveable read head disposed in a first position.
Figure 10:
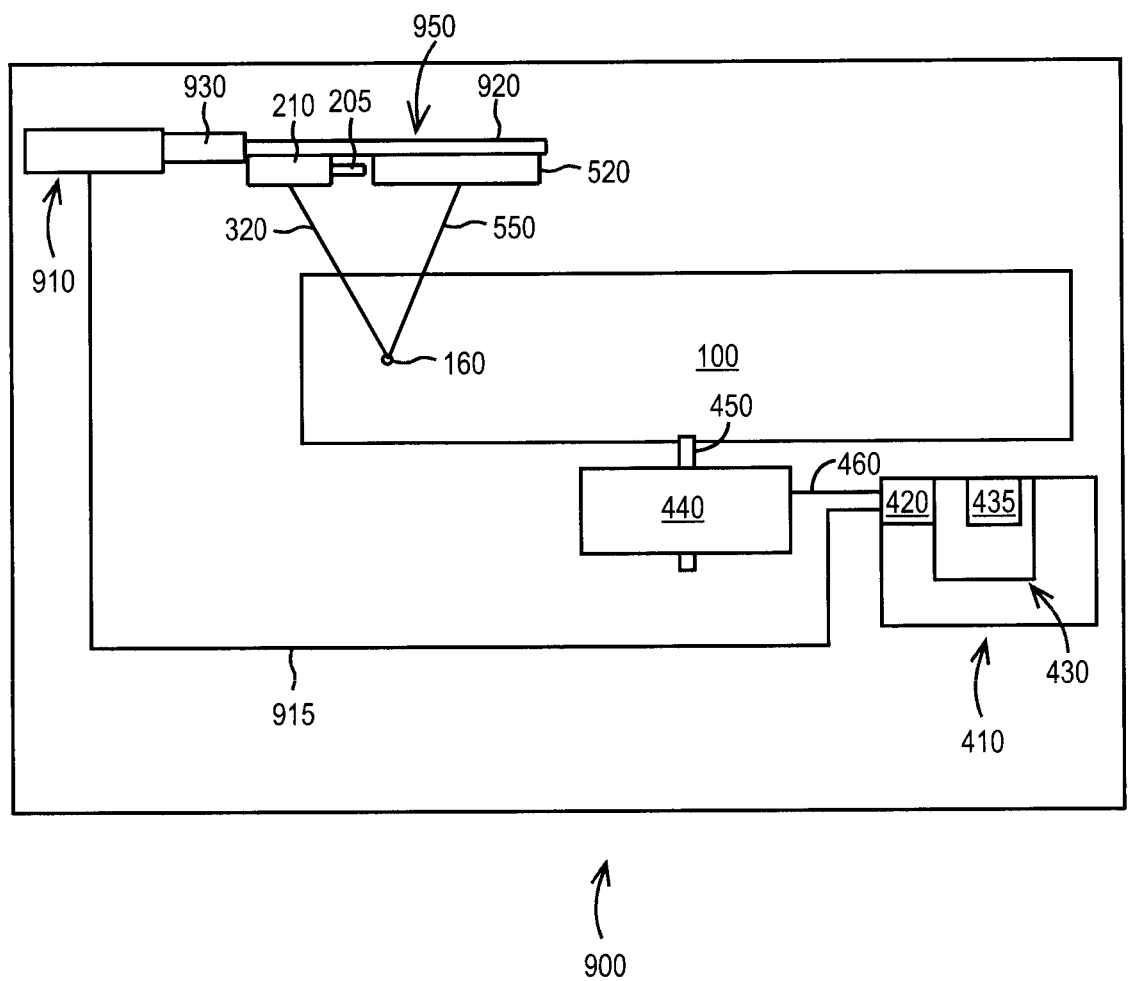
FIG. 10 is a block diagram showing the holographic drive of FIG. 9 being used to decode a hologram encoded in the outer storage portion of a holographic data storage medium.
Figure 11:
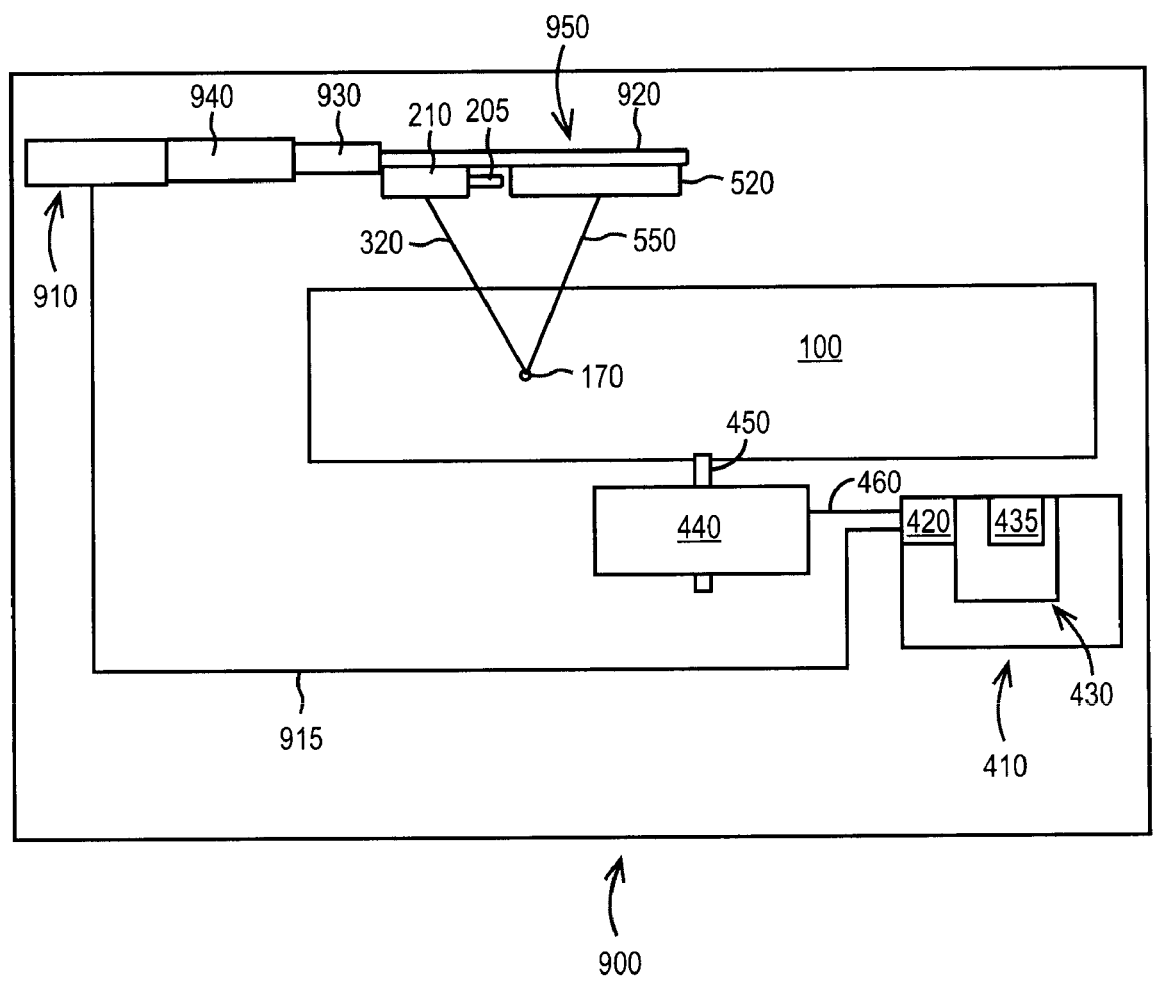
FIG. 11 is a block diagram showing the holographic drive of FIG. 9 being used to decode a hologram encoded in the inner storage portion of a holographic data storage medium.

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises holographic data storage system 300 (FIGS. 3, 5), holographic drive 400 (FIGS. 4, 6), and holographic drive 900 (FIGS. 9, 10, 11).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822, instructions 824, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into convolution encoded images. Those images are transferred to RSLM 310 (FIGS. 3, 4, 6).

Figure 1:
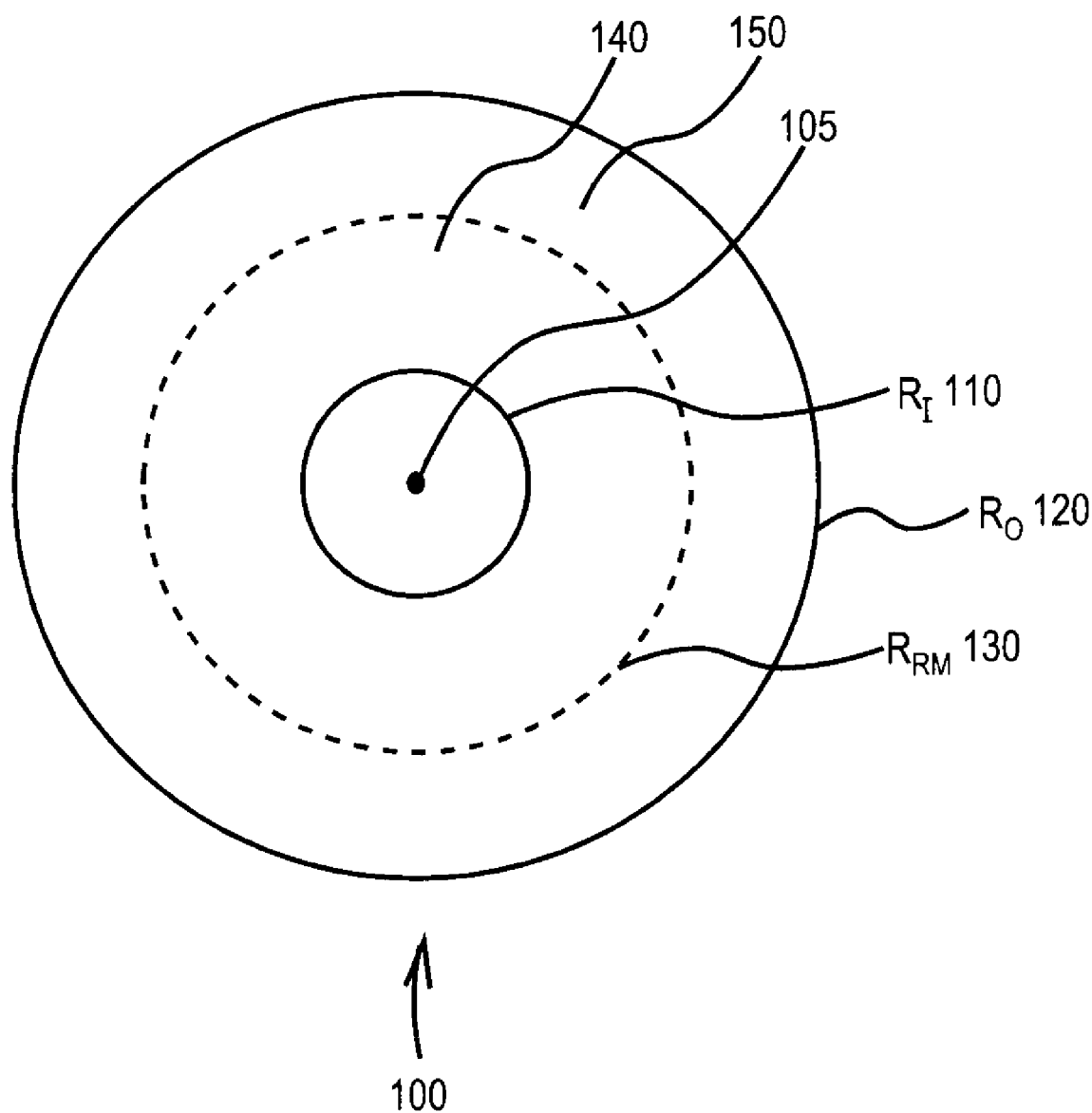
FIG. 1 is top view of a holographic data storage medium.

FIG. 1 illustrates holographic data storage medium 100 comprising geometric center-of-disk 105. A plurality of interference patterns can be encoded within holographic data storage medium between the inner radius $R_I$ 110 and the outer radius $R_O$ 120. RAID-Mirror boundary radius $R_{RM}$ 130 comprises the half-capacity radius of holographic data storage medium 100, wherein that RRM is calculated using Equation (1).

$$R_{RM} = [(R_O^2 - R_I^2)/2]^{1/2} \quad (1)$$

Applicants' method to store information encodes a first copy of a hologram between the $R_{RM}$ and the $R_O$ of a first holographic data storage medium. Outer storage portion 150 of holographic data storage medium 100 is defined by RAID-Mirror boundary radius $R_{RM}$ 130 and outer radius $R_O$ 120. For purposes of this Application, a hologram encoded within portion 150 comprises a "RAID Hologram."

Applicants' method also encodes a second copy of the hologram between the $R_I$ and the $R_{RM}$ of a second holographic data storage medium. Inner storage portion 140 of holographic data storage medium 100 is defined by RAID-Mirror boundary radius $R_{RM}$ 130 and inner radius $R_I$ 110. For purposes of this Application, a hologram encoded within portion 140 comprises a "Mirror Hologram."

Figure 2:
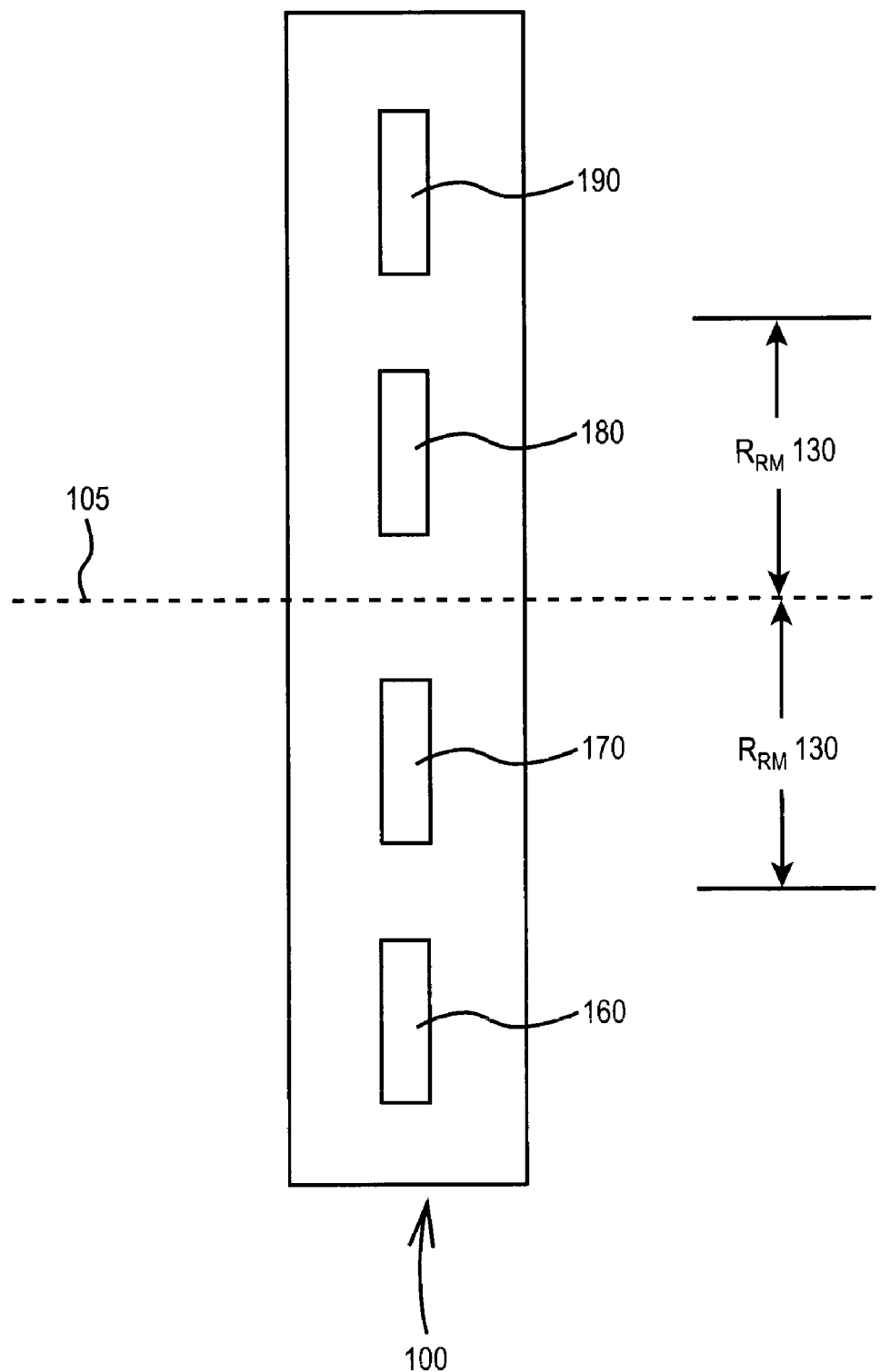
FIG. 2 is a cross-sectional view of the holographic data storage medium of FIG. 1.

Referring now to FIG. 2, holograms 170 and 180 are encoded within inner storage portion 140 of holographic data storage medium 100, and therefore, comprise "Mirror Holograms." Holograms 160 and 190 are encoded within outer storage portion 150 of holographic data storage medium 100, and therefore, comprise "RAID Holograms."

In certain embodiments, Applicants' holographic drive 400 (FIGS. 4, 6) and holographic drive 900 (FIGS. 9, 10, 11) utilize a constant-linear-velocity ("CLV") wherein the angular velocity of the holographic data storage medium is inversely proportional to the radius. As a result, the angular velocity of the holographic data storage medium is lower during read operations because Applicants' method encodes the RAID Holograms in the outer storage portion 150 (FIG. 1) of the holographic data storage medium, where the power consumption by drive servo 440 is lower due to this lower angular velocity.

Figure 8A:
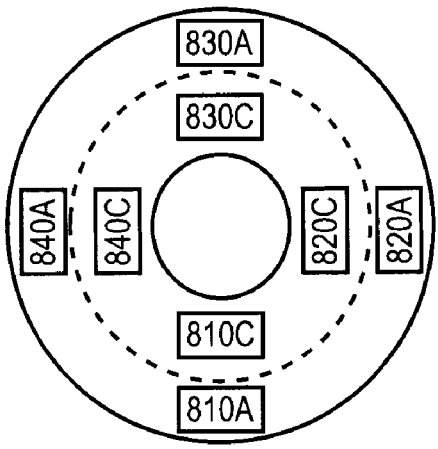
FIGS. 8A, 8B, and 8C, illustrate an implementation of Applicants' holographic RAID storage protocol.
Figure 8C:
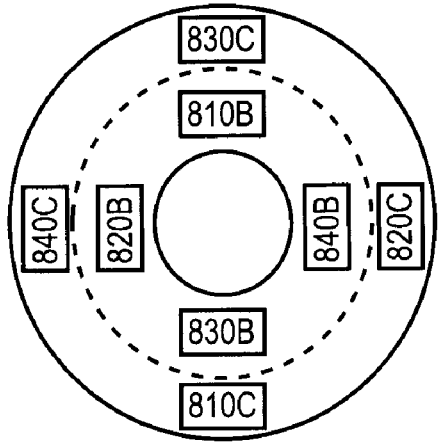
Figure 8B:
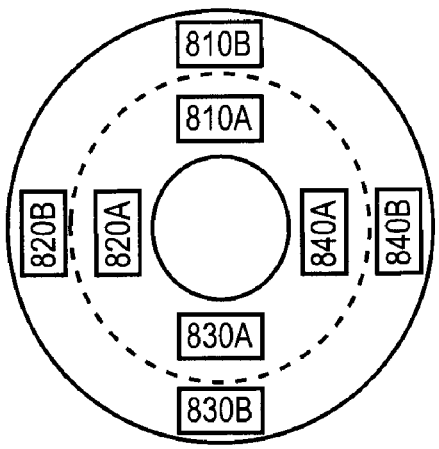

FIG. 8 illustrates Applicants' Holographic RAID 50 storage protocol. Using this protocol, a file, such as for example file 810, is written to holographic data storage media as two data holograms 810A and 810B, and wherein the parity for the information comprising holograms 810A and 810B is encoded in parity hologram 810C.

Referring now to FIG. 8, RAID Holograms 810A, 820A, 830A, and 840A, are encoded in the outer storage portion of holographic data storage medium 802. Mirror Holograms 810A, 820A, 830A, and 840A, are encoded in the inner storage portion of holographic data storage medium 804.

RAID Holograms 810B, 820B, 830B, and 840B, are encoded in the outer storage portion of holographic data storage medium 804. Mirror Holograms 810B, 820B, 830B, and 840B, are encoded in the inner storage portion of holographic data storage medium 806.

RAID Holograms 810C, 820C, 830C, and 840C, are encoded in the outer storage portion of holographic data storage medium 806. Mirror Holograms 810C, 820C, 830C, and 840C, are encoded in the inner storage portion of holographic data storage medium 802.

Only two of holographic data storage media 802, 804, and 806, need to be mounted in holographic data storage system 300 (FIGS. 3, 5), or in Applicants' holographic data storage drive 400 (FIGS. 4, 6), or in Applicants' holographic data storage drive 900 (FIGS. 9, 10, 11), for a read of all four files encoded therein. For example RAID Hologram 810A and Mirror Hologram 810C, can be read from medium 802. The remaining component hologram 810B can be read from medium 804 as a RAID Hologram, or from medium 806 as a Mirror Hologram.

Moreover, if any two of holographic data storage media 802, 804, and 806, are totally destroyed or missing, each of the four original files can still be retrieved. For example, if media 804 and 806 are destroyed or missing, file 810 can be reconstructed by reading RAID Hologram 810A and Mirror Hologram 810C from medium 802. The remaining element, namely hologram 820B, can be restored using an Exclusive OR ("XOR") parity calculation between the information in data hologram 810A and parity hologram 810C.

Referring now to FIG. 9, in certain embodiments Applicants' holographic drive 900 comprises member 920 attached to solenoid/motor 910, wherein drive controller 410 can cause solenoid/motor 910 to extend member 920 outwardly. Laser light source 205, beam splitter 210, and optical sensor array 520 (FIGS. 4, 5, 6, 9, 10, 11), are disposed on member 920. Member 920 in combination with Laser light source 205, beam splitter 210, and optical sensor array 520, comprise holographic read head 950.

In the illustrated embodiment of FIG. 10, holographic read head 950 has been moved laterally by extension member 930. Further in the illustrated embodiment of FIG. 10, reference beam 320 is shown interfering with an interference pattern comprising RAID Hologram 160 (FIGS. 2, 10) to form reconstructed data beam 550 (FIGS. 5, 6, 10) which comprises the image encoded in RAID Hologram 160. Reconstructed data beam 550 is projected onto input screen 520 (FIGS. 4, 5, 6, 9, 10, 11).

In the illustrated embodiment of FIG. 11, holographic read head 950 has been moved further laterally by extension members 930 and 940. Further in the illustrated embodiment of FIG. 11, reference beam 320 is shown interfering with encoded Mirror Hologram 170 (FIG. 2) to form reconstructed data beam 550 (FIGS. 5, 10) which comprises the image encoded in Mirror Hologram 170. Reconstructed data beam 550 is projected onto input screen 520 (FIGS. 4, 5, 6, 9, 10, 11).

Figure 12:
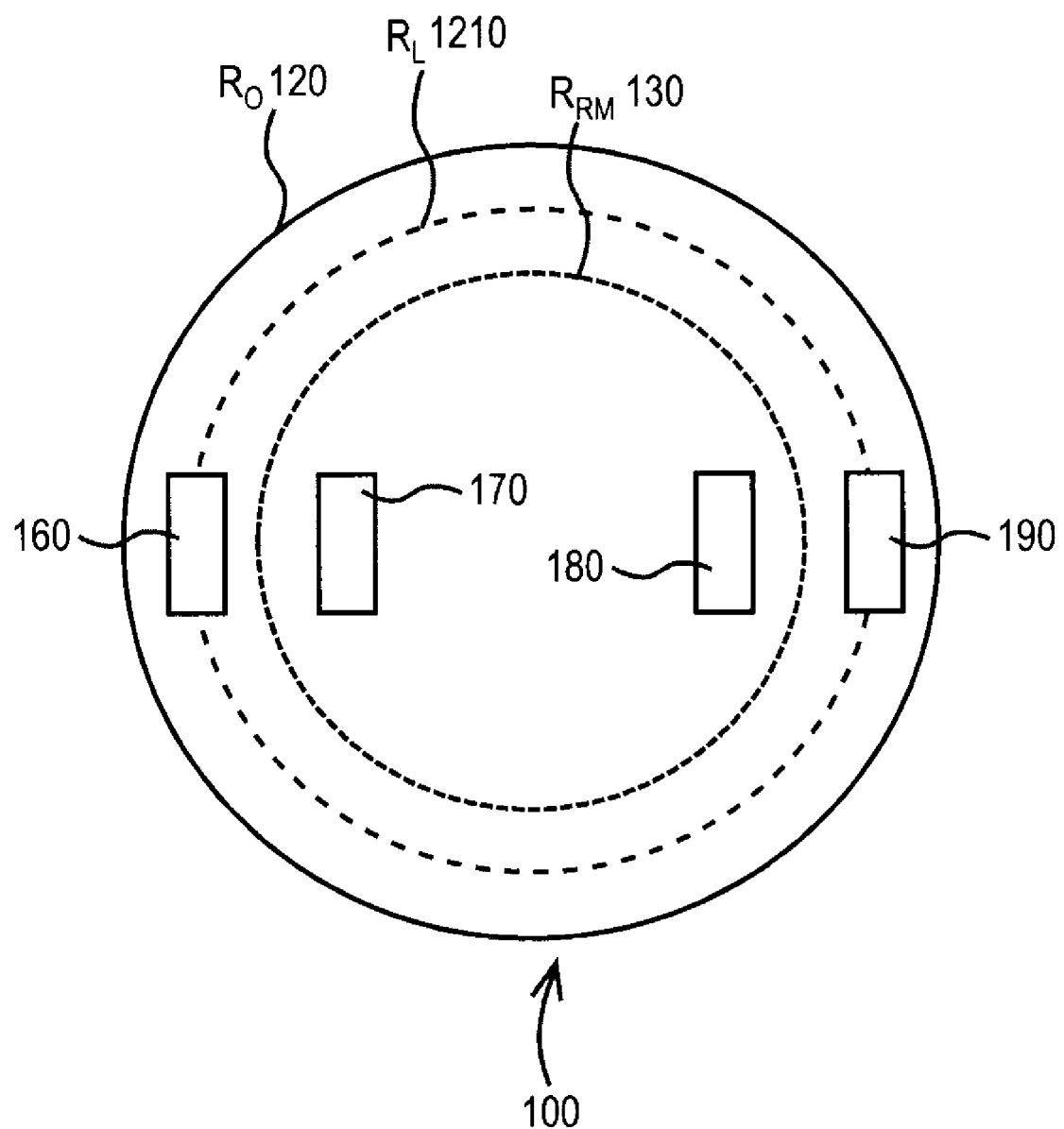
FIG. 12 is a top view of the holographic data storage medium of FIG. 1 showing Applicants' Loitering Radius $R_L$ 1210.

Referring now to FIG. 12, in certain embodiments, Applicants' method positions Applicants' holographic read head 950 (FIGS. 9, 10, 11) above Read-Loiter radius $R_L$ 1210. Radius $R_L$ comprises the mid-capacity point between outer radius $R_O$ 120 and RAID-Mirror boundary radius $R_{RM}$ 130. Applicants have found that radius $R_L$ 1210 comprises the optimal position for Applicants' holographic read head for random reads of RAID Holograms encoded in the outer storage portion 150 of holographic data storage medium 100. If Applicants' holographic read head is positioned at radius RL, then the directional-probability of a seek to a random file is 50% inwards from, and 50% outwards from, that loitering position.

For a holographic data storage medium comprising no unused storage capacity, i.e. a "filled" storage medium, the Read-Loiter radius $R_L$ 1210 is defined by Equation (2).

$$R_L = [(R_O^2 - R_{RM}^2)/2]^{1/2} \quad (2)$$

If the holographic data storage medium is not filled, radius RRM is assigned a value corresponding to the innermost radius at which a RAID Hologram is encoded. Thus, $R_L$ 1210 will vary as holographic data storage medium 100 has RAID Holograms encoded therein.

Figure 13:
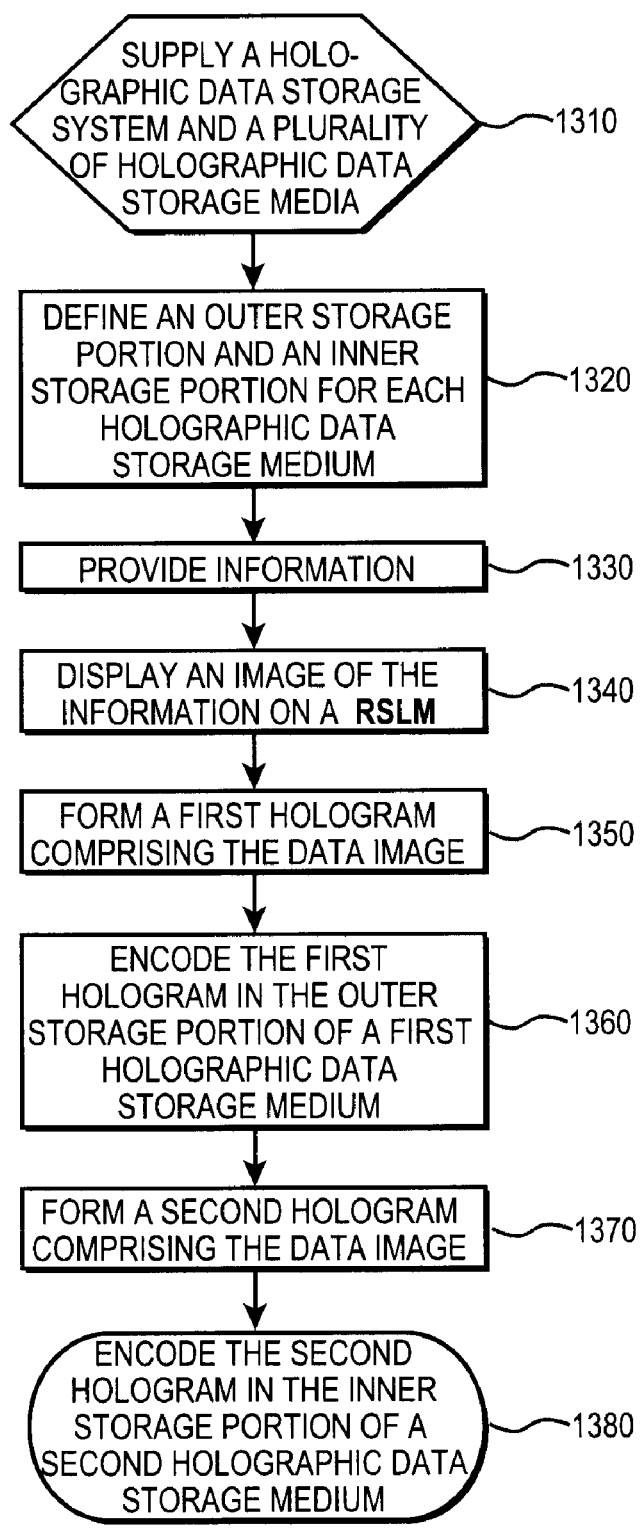
FIG. 13 is a flow chart summarizing the steps of a first embodiment of Applicants' method.

Applicants' invention comprises a method to store information in multiple holographic data storage media. FIG. 13 summarizes one embodiment of Applicants' method. Referring to FIG. 13, in step 1310 the method supplies a plurality of holographic data storage media and a holographic data storage system, such as and without limitation holographic data storage system 300 (FIGS. 3, 5), data storage and retrieval system 700 (FIG. 7), holographic drive 400 (FIGS. 4, 6), and/or holographic drive 900 (FIGS. 9, 10, 11).

In step 1320, the method defines an inner storage portion and an outer storage portion for each of the plurality of holographic data storage media of step 1310. In certain embodiments, the method in step 1320 calculates a RAID-Mirror radius $R_{RM}$ for each of the holographic data storage media using equation (1) to define the inner storage portion and the outer storage portion. In certain embodiments, step 1320 is performed by a storage controller, such as storage controller 760 (FIG. 7). In certain embodiments, step 1320 is performed by a drive controller, such as drive controller 410 (FIGS. 4, 6, 9, 10, 11).

In step 1330, the method provides information. In certain embodiments, step 1330 is performed by one or more host computers, such as and without limitation one or more of host computers 710 (FIG. 7), 720 (FIG. 7), and/or 730 (FIG. 7). Step 1330 further comprises receiving the information. In certain embodiments, the information is received by a storage controller, such as storage controller 760. In certain embodiments, the information is received by a drive controller, such as drive controller 410.

In step 1340, the method displays an image of the information on an RSLM, such as and without limitation RSLM 310 (FIGS. 3, 4, 6). In certain embodiments, step 1340 is performed by a storage controller, such as storage controller 760 (FIG. 7). In certain embodiments, step 1340 is performed by a drive controller, such as drive controller 410 (FIGS. 4, 6, 9, 10, 1).

In step 1350, the method forms a hologram comprising the image of step 1340. In certain embodiments, step 1350 is performed by a storage controller, such as storage controller 760 (FIG. 7). In certain embodiments, step 1350 is performed by a drive controller, such as drive controller 410 (FIGS. 4, 6, 9, 10, 11).

In step 1360, the method encodes the hologram of step 1340 into the outer storage portion of a first holographic data storage medium. In certain embodiments, step 1360 is performed by a storage controller, such as storage controller 760 (FIG. 7). In certain embodiments, step 1360 is performed by a drive controller, such as drive controller 410 (FIGS. 4, 6, 9, 10, 11).

In step 1370, the method again forms a hologram comprising the image of step 1340. In certain embodiments, step 1370 is performed by a storage controller, such as storage controller 760 (FIG. 7). In certain embodiments, step 1370 is performed by a drive controller, such as drive controller 410 (FIGS. 4, 6, 9, 10, 11).

In step 1380, the method encodes the hologram of step 1370 into the inner storage portion of a second holographic data storage medium. In certain embodiments, step 1380 is performed by a storage controller, such as storage controller 760 (FIG. 7). In certain embodiments, step 1380 is performed by a drive controller, such as drive controller 410 (FIGS. 4, 6, 9, 10, 11).

Figure 14:
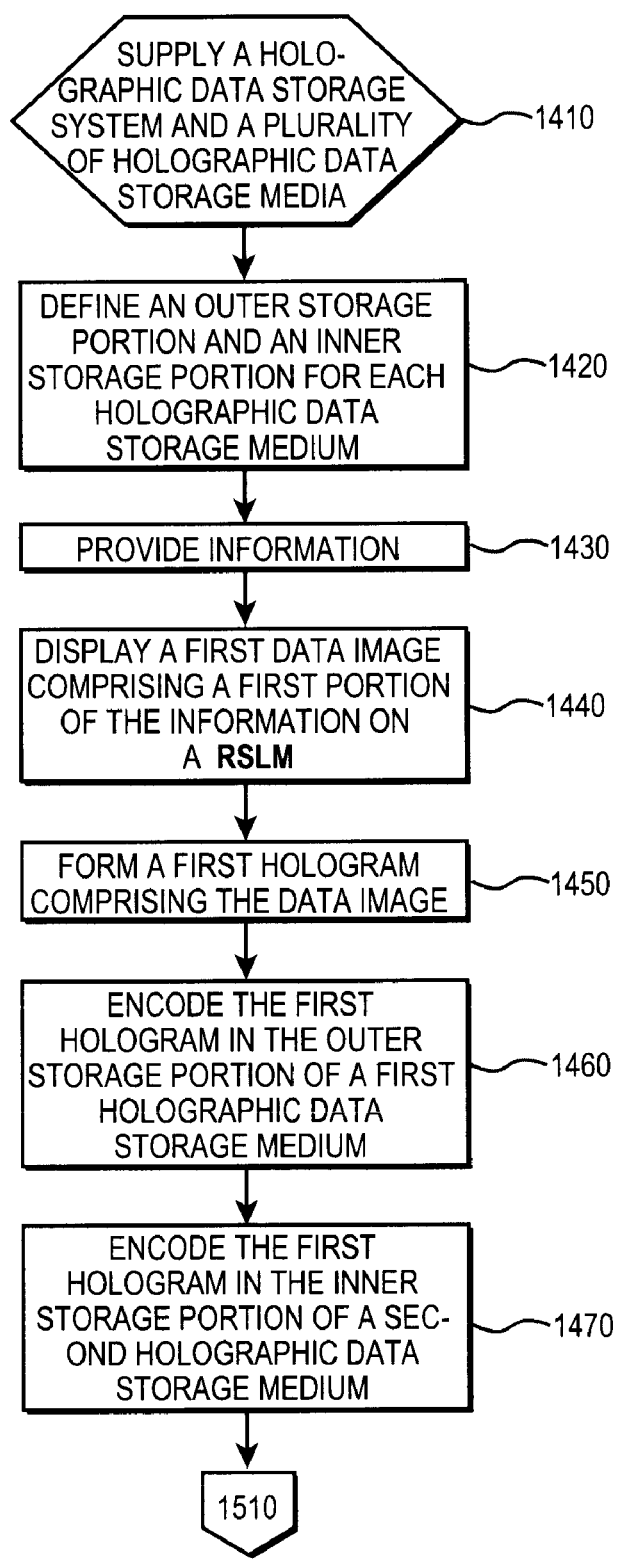
FIG. 14 is a flow chart summarizing the initial steps of a second embodiment of Applicants' method.
Figure 15:
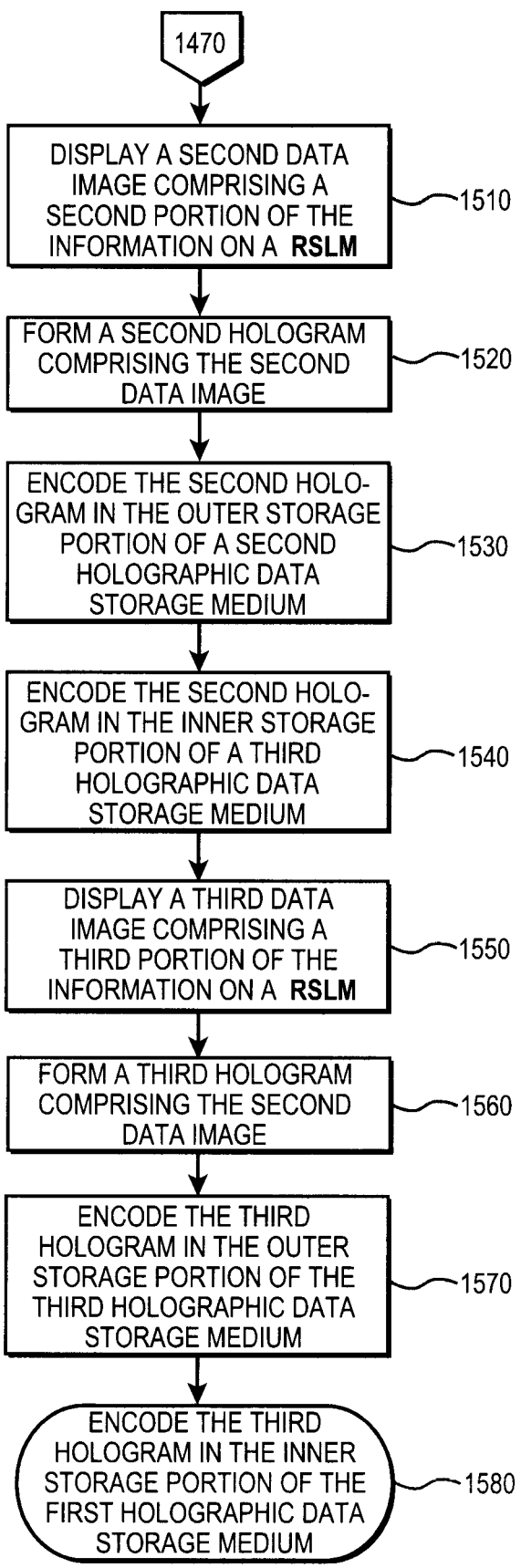
FIG. 15 is a flow chart summarizing additional steps of the second embodiment of Applicants' method.

FIGS. 14 and 15 summarize the steps of a second embodiment of Applicants' method to store information in multiple holographic data storage media using a holographic RAID storage protocol. Referring to FIG. 14, in step 1410 the method supplies a plurality of holographic data storage media and a holographic data storage system, such as and without limitation holographic data storage system 300 (FIGS. 3, 5), data storage and retrieval system 700 (FIG. 7), holographic drive 400 (FIGS. 4, 6), and/or holographic drive 900 (FIGS. 9, 10, 11).

In step 1420, the method defines an inner storage portion and an outer storage portion for each of the plurality of holographic data storage media of step 1310. In certain embodiments, the method calculates a RAID-Mirror radius $R_{RM}$ for each of the holographic data storage media using equation (1) to define the inner storage portion and the outer storage portion. In certain embodiments, step 1420 is performed by a storage controller, such as storage controller 760 (FIG. 7). In certain embodiments, step 1420 is performed by a drive controller, such as drive controller 410 (FIGS. 4, 6, 9, 10, 11).

In step 1430, the method provides information. In certain embodiments, step 1430 is performed by one or more host computers, such as and without limitation one or more of host computers 710 (FIG. 7), 720 (FIG. 7), and/or 730 (FIG. 7). Step 1430 further comprises receiving the information. In certain embodiments, the information is received by a storage controller, such as storage controller 760. In certain embodiments, the information is received by a drive controller, such as drive controller 410.

In step 1440, the method displays on an RSLM, such as and without limitation RSLM 310 (FIGS. 3, 4, 6), a first image comprising a first portion of the information of step 1430. In certain embodiments, step 1440 is performed by a storage controller, such as storage controller 760 (FIG. 7). In certain embodiments, step 1440 is performed by a drive controller, such as drive controller 410 (FIGS. 4, 6, 9, 10, 11).

In step 1450, the method forms a first hologram comprising the first image of step 1440. In certain embodiments, step 1450 is performed by a storage controller, such as storage controller 760 (FIG. 7). In certain embodiments, step 1450 is performed by a drive controller, such as drive controller 410 (FIGS. 4, 6, 9, 10, 11).

In step 1460, the method encodes the first hologram of step 1440 into the outer storage portion of a first holographic data storage medium. In certain embodiments, step 1460 is performed by a storage controller, such as storage controller 760

(FIG. 7). In certain embodiments, step 1460 is performed by a drive controller, such as drive controller 410 (FIGS. 4, 6, 9, 10, 11).

In step 1470, the method encodes the first hologram of step 1440 into the inner storage portion of a second holographic data storage medium. In certain embodiments, step 1470 is performed by a storage controller, such as storage controller 760 (FIG. 7). In certain embodiments, step 1470 is performed by a drive controller, such as drive controller 410 (FIGS. 4, 6, 9, 10, 11). Applicants' method transitions from step 1470 to step 1510 (FIG. 15).

Referring now to FIG. 15, in step 1510, the method displays on an RSLM, such as and without limitation RSLM 310 (FIGS. 3, 4, 6), a second image comprising a second portion of the information of step 1430. In certain embodiments, step 1510 is performed by a storage controller, such as storage controller 760 (FIG. 7). In certain embodiments, step 1510 is performed by a drive controller, such as drive controller 410 (FIGS. 4, 6, 9, 10, 11).

In step 1520, the method forms a second hologram comprising the second image of step 1510. In certain embodiments, step 1520 is performed by a storage controller, such as storage controller 760 (FIG. 7). In certain embodiments, step 1520 is performed by a drive controller, such as drive controller 410 (FIGS. 4, 6, 9, 10, 11).

In step 1530, the method encodes the second hologram of step 1520 into the outer storage portion of the second holographic data storage medium. In certain embodiments, step 1530 is performed by a storage controller, such as storage controller 760 (FIG. 7). In certain embodiments, step 1530 is performed by a drive controller, such as drive controller 410 (FIGS. 4, 6, 9, 10, 11).

In step 1540, the method encodes the second hologram of step 1520 into the inner storage portion of a third holographic data storage medium. In certain embodiments, step 1540 is performed by a storage controller, such as storage controller 760 (FIG. 7). In certain embodiments, step 1540 is performed by a drive controller, such as drive controller 410 (FIGS. 4, 6, 9, 10, 11).

In step 1550, the method displays on an RSLM, such as and without limitation RSLM 310 (FIGS. 3, 4, 6), a third image comprising a third portion of the information of step 1430. In certain embodiments, step 1550 is performed by a storage controller, such as storage controller 760 (FIG. 7). In certain embodiments, step 1550 is performed by a drive controller, such as drive controller 410 (FIGS. 4, 6, 9, 10, 11).

In step 1560, the method forms a third hologram comprising the third image of step 1550. In certain embodiments, step 1560 is performed by a storage controller, such as storage controller 760 (FIG. 7). In certain embodiments, step 1560 is performed by a drive controller, such as drive controller 410 (FIGS. 4, 6, 9, 10, 11).

In step 1570, the method encodes the third hologram of step 1560 into the outer storage portion of the third holographic data storage medium. In certain embodiments, step 1570 is performed by a storage controller, such as storage controller 760 (FIG. 7). In certain embodiments, step 1570 is performed by a drive controller, such as drive controller 410 (FIGS. 4, 6, 9, 10, 11).

In step 1580, the method encodes the third hologram of step 1560 into the inner storage portion of the first holographic data storage medium. In certain embodiments, step 1580 is performed by a storage controller, such as storage controller 760 (FIG. 7). In certain embodiments, step 1580 is performed by a drive controller, such as drive controller 410 (FIGS. 4, 6, 9, 10, 11).

In certain embodiments, individual steps recited in FIGS. 13, 14, and/or 15, may be combined, eliminated, or reordered.

In certain embodiments, Applicants' invention includes instructions, such as instructions 824 (FIG. 7), encoded in memory 763 (FIG. 7), and/or memory instructions 435 (FIGS. 4, 6, 9, 10, 11) encoded in memory 430, where those instructions are executed by a processor, such as processor 764 (FIG. 7) and/or processor 420 (FIGS. 4, 6, 9, 10, 11), to perform one or more of steps 1320, 1330, 1340, 1350, 1360, 1370, and/or 1380, recited in FIG. 13, and/or one or more to steps 1420, 1430, 1440, 1450, 1460, and/or 1470, recited in FIG. 14, and/or one or more of steps 1510, 1520, 1530, 1540, 1550, 1560, 1570, and/or 1580, recited in FIG. 15.

In certain embodiments, Applicants' invention includes instructions residing in any other computer program product, where those instructions are executed by a computer external to, or internal to holographic data storage system 300 (FIGS. 3, 5), holographic drive 400 (FIGS. 4, 6), data storage and retrieval system 700 (FIG. 7), and/or holographic drive 900 (FIGS. 9, 10, 11), to perform one or more of steps 1320, 1330, 1340, 1350, 1360, 1370, and/or 1380, recited in FIG. 13, and/or one or more to steps 1420, 1430, 1440, 1450, 1460, and/or 1470, recited in FIG. 14, and/or one or more of steps 1510, 1520, 1530, 1540, 1550, 1560, 1570, and/or 1580, recited in FIG. 15. In either case, the instructions may be encoded in an information storage medium comprising, for example, a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to store information in multiple holographic data storage media, comprising the steps of:
    providing a first holographic data storage medium;
    defining an inner storage portion of said first holographic data storage medium and an outer storage portion of said first holographic data storage medium;
    providing a second holographic data storage medium;
    defining an inner storage portion of said second holographic data storage medium and an outer storage portion of said second holographic data storage medium;
    providing information;
    encoding a first hologram comprising said information into said outer storage portion of said first holographic data storage medium; and
    encoding a second hologram comprising said information into said inner storage portion of said second holographic data storage medium;
    wherein:
    said first holographic data storage medium comprises a first outer radius $R_{10}$ and a first inner radius $R_{11}$,
    said defining an inner storage portion of said first holographic data storage medium step comprises the step of calculating a first RAID-Mirror radius $R_{1RRM}$ equal to $[(R_{10}^2 - R_{11}^2)/2]^{1/2}$;
    said first RAID-Mirror radius separates said first inner storage portion and said first outer storage portion.

2. The method of claim 1, wherein said second holographic data storage medium comprises a second outer radius $R_{20}$ and a second inner radius $R_{21}$, wherein said defining an inner storage portion of said second holographic data storage medium 2 step comprises the step of calculating a second RAID-Mirror radius $R_{2RRM}$ equal to $[(R_{20}^2-R_{21}^2)/2]^{1/2}$;
  wherein said second RAID-Mirror radius separates said second inner storage portion and said second outer storage portion.

3. The method of claim 1, further comprising the steps of:
defining a Read-Loiter radius, wherein said Read-Loiter radius is greater than said first RAID-Mirror radius and less than said first outer radius;
mounting said first holographic data storage medium in a holographic drive comprising a moveable holographic read head;
positioning said moveable holographic read head above said Read-Loiter radius.

4. The method of claim 1, further comprising the steps of:
providing a third holographic data storage medium;
defining an inner storage portion and an outer storage portion for said third holographic data storage medium;
wherein said encoding steps comprise:
forming a first hologram comprising a first portion of said information;
encoding said first hologram in the outer storage portion of said first holographic data storage medium and in the inner storage portion of said second holographic data storage medium;
forming a second hologram comprising a second portion of said information;
encoding said second hologram in the outer storage portion of said second holographic data storage medium and in the inner storage portion of said third holographic data storage medium;
forming a third hologram comprising parity information for said first portion of said information and said second portion of said information; and
encoding said third hologram in the outer storage portion of said third holographic data storage medium and in the inner storage portion of said first holographic data storage medium.

5. The method of claim 4, further comprising the step of reading said information using any two of said three holographic data storage media.

6. The method of claim 4, further comprising the step of reconstructing said information using any one of said three holographic data storage media.

7. An article of manufacture comprising a computer readable medium having computer readable program code disposed therein to store information in multiple holographic data storage media, the computer readable program code comprising a series of computer readable program steps to effect:
  defining an inner storage portion of a first holographic data storage medium and a outer storage portion of said first holographic data storage medium;
  defining an inner storage portion of a second holographic data storage medium and an outer storage portion of said second holographic data storage medium;
  receiving information;
  encoding a first hologram comprising said information in said outer storage portion of said first holographic data storage medium; and
  encoding a second hologram comprising said information in said inner storage portion of said second holographic data storage medium
  wherein:
    said first holographic data storage medium comprises a first outer radius $R_{10}$ and a first inner radius $R_{11}$,
    said computer readable program code to define an inner storage portion of said first holographic data storage medium comprises a series of computer readable program steps to effect calculating a first RAID-Mirror radius $R_{1RRM}$ equal to $[(R_{10}^2-R_{11}^2)/2]^{1/2}$;
    said first RAID-Mirror radius separates said first inner storage portion and said first outer storage portion.

8. The article of manufacture of claim 7, wherein said second holographic data storage medium comprises a second outer radius $R_{20}$ and a second inner radius $R_{21}$, wherein said computer readable program code to define an inner storage portion of said second holographic data storage medium step comprises a series of computer readable program steps to effect calculating a second RAID-Mirror radius $R_{2RRM}$ equal to $[(R_{20}^2-R_{21}^2)/2]^{1/2}$;
  wherein said second RAID-Mirror radius separates said second inner storage portion and said second outer storage portion.

9. The article of manufacture of claim 7, wherein said article of manufacture is in communication with a holographic drive comprising a moveable holographic read head, said computer readable program code further comprising a series of computer readable program steps to effect:
  defining a first Read-Loiter radius, wherein said first Read-Loiter radius is greater than said first RAID-Mirror radius and less than said first outer radius;
  positioning said moveable holographic read head adjacent said first Read-Loiter radius when said first holographic data storage medium is mounted in said holographic drive.

10. The article of manufacture of claim 7, said computer readable program code further comprising a series of computer readable program steps to effect:
  defining an inner storage portion and an outer storage portion for a third holographic data storage medium;
  wherein said computer readable program to encode said information comprises a series of computer readable program steps to effect:
  forming a first hologram comprising a first portion of said information;
  encoding said first hologram in the outer storage portion of said first holographic data storage medium and in the inner storage portion of said second holographic data storage medium;
  forming a second hologram comprising a second portion of said information;
  encoding said second hologram in the outer storage portion of said second holographic data storage medium and in the inner storage portion of said third holographic data storage medium;
  forming a third hologram comprising parity information for said first portion of said information and said second portion of said information; and
  encoding said third hologram in the outer storage portion of said third holographic data storage medium and in the inner storage portion of said first holographic data storage medium.

11. The article of manufacture of claim 10, said computer readable program code further comprising a series of computer readable program steps to effect reading said information using any two of said three holographic data storage media.

12. The article of manufacture of claim 10, said computer readable program code further comprising a series of computer readable program steps to effect reconstructing said information using any one of said three holographic data storage media.

13. A computer program product encoded in an information storage medium disposed in a controller comprising a processor, said computer program product being useable with said processor to store information in multiple holographic data storage media, comprising:

computer readable program code which causes said programmable computer processor to define an inner storage portion of a first holographic data storage medium and an outer storage portion of said first holographic data storage medium;

computer readable program code which causes said programmable computer processor to define an inner storage portion of a second holographic data storage medium and an outer storage portion of said second holographic data storage medium;

computer readable program code which causes said programmable computer processor to receive information;

computer readable program code which causes said programmable computer processor to encode a first hologram comprising said information in said outer storage portion of said first holographic data storage medium; and computer readable program code which causes said programmable computer processor to encode a second hologram comprising said information in said inner storage portion of said second holographic data storage medium;

wherein:

said first holographic data storage medium comprises a first outer radius $R_{10}$ and a first inner radius $R_{11}$, said computer readable program code which causes said programmable computer processor to define an inner storage portion of said first holographic data storage medium comprises computer readable program code which causes said programmable computer processor to calculate a first RAID-Mirror radius $R_{1RRM}$ equal to $[(R_{10}^2-R_{11}^2)/2]^{1/2}$;

said first RAID-Mirror radius separates said first inner storage portion and said first outer storage portion.

14. The computer program product of claim 13, wherein said second holographic data storage medium comprises a second outer radius $R_{20}$ and a second inner radius $R_{21}$, wherein said computer readable program code which causes said programmable computer processor to define an inner storage portion of said second holographic data storage medium step comprises computer readable program code which causes said programmable computer processor to calculate a second RAID-Mirror radius $R_{2RRM}$ equal to $[(R_{20}^2-R_{21}^2)/2]^{1/2}$;

wherein said second RAID-Mirror radius separates said second inner storage portion and said second outer storage portion.

15. The computer program product of claim 13, further comprising:

computer readable program code which causes said programmable computer processor to define an inner storage portion and an outer storage portion for a third holographic data storage medium;

wherein said computer readable program code which causes said programmable computer processor to encode said information comprises:

computer readable program code which causes said programmable computer processor to form a first hologram comprising a first portion of said information;

computer readable program code which causes said programmable computer processor to encode said first hologram in the outer storage portion of said first holographic data storage medium and in the inner storage portion of said second holographic data storage medium;

computer readable program code which causes said programmable computer processor to form a second hologram comprising a second portion of said information;

computer readable program code which causes said programmable computer processor to encode said second hologram in the outer storage portion of said second holographic data storage medium and in the inner storage portion of said third holographic data storage medium;

computer readable program code which causes said programmable computer processor to form a third hologram comprising parity information for said first portion of said information and said second portion of said information; and computer readable program code which causes said programmable computer processor to encode said third hologram in the outer storage portion of said third holographic data storage medium and in the inner storage portion of said first holographic data storage medium.

16. The computer program product of claim 15, further comprising computer readable program code which causes said programmable computer processor to read said information using any two of said three holographic data storage media.

17. The computer program product of claim 15, further comprising computer readable program code which causes said programmable computer processor to reconstruct said information using any one of said three holographic data storage media.

* * * * *